United States Patent
Martin et al.

(10) Patent No.: US 8,748,539 B2
(45) Date of Patent: Jun. 10, 2014

(54) PROPYLENE IMPACT COPOLYMERS HAVING GOOD OPTICAL PROPERTIES

(75) Inventors: Peter S. Martin, Houston, TX (US); Peter S. Dias, Missouri City, TX (US); Jason C. Brodil, Rosharon, TX (US); Li-Min Tau, Lake Jackson, TX (US); Debra R. Wilson, Missouri City, TX (US); Jeffrey D. Goad, Barboursville, WV (US); Matthew J. Fedec, Lake Jackson, TX (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 13/114,549

(22) Filed: May 24, 2011

(65) Prior Publication Data

US 2012/0302701 A1    Nov. 29, 2012

(51) Int. Cl.
*C08L 23/10*    (2006.01)
*C08L 23/04*    (2006.01)

(52) U.S. Cl.
USPC .......................................... 525/240; 525/191

(58) Field of Classification Search
USPC ................................................ 525/191, 240
See application file for complete search history.

(56) References Cited

U.S. PATENT DOCUMENTS

| | | |
|---|---|---|
| 7,078,463 B2 | 7/2006 | Su et al. |
| 2005/0054781 A1* | 3/2005 | Dharmarajan et al. ....... 525/240 |
| 2006/0173132 A1* | 8/2006 | Mehta et al. .................. 525/191 |
| 2010/0234507 A1 | 9/2010 | Pezzutti et al. |
| 2010/0249327 A1 | 9/2010 | Leland |
| 2011/0064931 A1 | 3/2011 | Tse et al. |
| 2011/0124817 A1 | 5/2011 | Dias et al. |

OTHER PUBLICATIONS

International Serach Report and Written Opinion, PCT/US12/39150, Jan. 8, 2013.

* cited by examiner

*Primary Examiner* — Irina S Zemel
*Assistant Examiner* — Jeffrey Lenihan
(74) *Attorney, Agent, or Firm* — Duane Morris LLP

(57) ABSTRACT

Propylene impact copolymers (ICPs) are provided which comprise: (a) a matrix phase which comprises from 60 to 95 weight % of a polypropylene polymer containing from 0 to 6 mole % of units derived from one or more alpha-olefins other than propylene, and (b) a dispersed phase which comprises from 5 to 40 weight % of a copolymer derived from a first comonomer which can be either propylene or ethylene together with a second alpha-olefin comonomer. The ICP is further characterized by having a beta/alpha ratio less than or equal to 1.1. The ICPs of the present invention are particularly well suited for applications requiring clear, tough polymers such as thin walled injection molded articles for frozen food packaging applications.

11 Claims, 1 Drawing Sheet

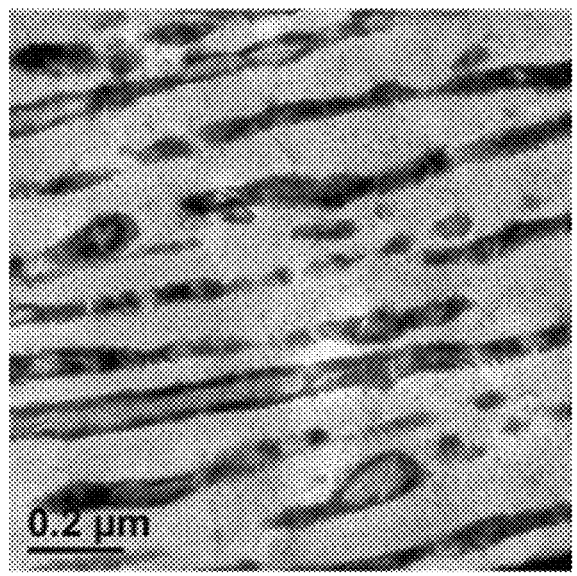

PROPYLENE IMPACT COPOLYMERS HAVING GOOD OPTICAL PROPERTIES

FIELD OF THE INVENTION

The present invention relates to new polypropylene impact copolymer (ICP) compositions. The compositions exhibit a combination of optical properties, such as transparency and haze, together with excellent impact resistance and stiffness, particularly for applications such as thin walled injection molding. The compositions of the present invention are both clear and tough and are therefore well suited for applications such as rigid packaging.

BACKGROUND AND SUMMARY OF THE INVENTION

Polypropylene compositions have gained wide commercial acceptance and usage in numerous applications because of the relatively low cost of the polymers and the desirable properties they exhibit. In general, polypropylene polymers, particularly propylene homopolymers, have a disadvantage of being brittle with low impact resistance, especially at low temperatures. To combat these issues, manufacturers have incorporated rubber, which forms a dispersed phase within the polypropylene matrix. These two-phase materials are referred to as impact copolymers or ICPs.

While impact resistance is improved, a major drawback to such materials is the poor transparency, mostly due to the rubber particles being large enough to affect light transmission in the heterophasic system. Accordingly, several attempts have been made to improve the transparency of heterophasic polymer systems.

Some ICPs have been able to achieve clarity by refractive index matching the dispersed phase to the matrix material. Other ICPs have sought to achieve clarity by increasing dispersed phase miscibility to achieve particles which are not large enough to affect the light transmission. While these approaches may produce clear materials, they generally lack the stiffness and/or toughness of a conventional ICP. It would be desirable to have an ICP which is clear, stiff and tough, and which is not based on either technique.

ICPs can be formed by blending a rubber with the matrix phase, but it is more preferred, from a cost-to-produce standpoint, that they are prepared using an in-reactor process, where the matrix and the dispersed phase are formed in separate reactors, typically operated in series. Thus, it would be desirable to have an in-reactor ICP which is clear, stiff, tough and which is not based on refractive index matching or using rubber with increased miscibility with the matrix.

The present invention is directed to such a polypropylene impact copolymer. The ICP of the present invention is a composition comprising: (a) a matrix phase which comprises from 60 to 95 weight % of a polypropylene polymer containing from 0 to 6 mole % of units derived from one or more alpha-olefins other than propylene, and (b) a dispersed phase which comprises from 5 to 40 weight % of a copolymer derived from propylene and ethylene, where the units derived from ethylene comprises from 55 to 80 weight % of the dispersed phase. The ICP is further characterized by having a beta/alpha ratio less than or equal to 1.1.

DETAILED DESCRIPTION OF THE DRAWINGS

FIG. 1 is a TEM image taken from ICP of Example 2.

DETAILED DESCRIPTION OF THE INVENTION

The following analytical methods and definitions are used in the present invention:

The term "polymer", as used herein, refers to a polymeric compound prepared by polymerizing monomers, whether of the same or a different type. The generic term polymer thus embraces the term "homopolymer", usually employed to refer to polymers prepared from only one type of monomer, as well as "copolymer" which refers to polymers prepared from two or more different monomers.

"Polypropylene" shall mean polymers comprising greater than 50% by weight of units which have been derived from propylene monomer. This includes polypropylene homopolymers or copolymers (meaning units derived from two or more comonomers).

Density is determined in accordance with ASTM D792.

"Melt flow rate" also referred to as "MFR" is determined according to ASTM D1238 (230° C., 2.16 kg).

"$E_m$" refers to the weight percent of comonomer (typically ethylene) in the matrix phase. $E_m$ can be determined during production using the mass-energy balance method as generally known in the art. $E_m$ can also be determined by isolating a sample of the matrix polymer and analyzing using Fourier transform infrared spectroscopy ("FTIR") as known the art. $E_m$ can also be estimated by analyzing the entire ICP using DSC melting point.

"$E_{tot}$" refers to total percent by weight comonomer (typically ethylene) in the propylene impact copolymer, and is measured by a well known method reported by S. Di Martino and M. Kelchtermans "Determination of the Composition of Ethylene-Propylene Rubbers Using 13C-NMR Spectroscopy" J. of Applied Polymer Science, v 56, 1781-1787 (1995).

"$F_c$" refers to the percent by weight of the dispersed phase in the total impact copolymer. In general $F_c$ is equal to the ratio of amount of dispersed phase to the total amount of material made, which can readily be determined by mass balance or FTIR. FTIR is the preferred method when the matrix phase contains no comonomer. Alternatively, for such impact copolymers containing no comonomer in the matrix, the dispersed phase content in the impact copolymer generally can be assessed by determining the amount of material which remains soluble in xylene at room temperature. Xylene Solubles (XS) is measured according to the following procedure: 0.4 g of polymer is dissolved in 20 ml of xylenes with stirring at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration was maintained with Viscotek PolyCAL™ polystyrene standards. The amount of xylene solubles measured by this Viscotek method corresponds to the amount of dispersed rubber phase (Fc) in the impact copolymer. For impact copolymers containing comonomer in the matrix, the mass balance method is a more applicable method to determine Fc.

"$E_c$" refers to the ethylene content percent by weight in the dispersed phase and is calculated as $E_c=[E_{tot}-E_m(1-F_c)]/F_c$.

"Beta/alpha" (b/a or β/α) is conceptually the ratio of the dispersed phase (ethylene propylene rubber or EPR) molecular weight to matrix phase molecular weight. It is normally measured as the intrinsic viscosity (IV) of the dispersed phase divided by the IV of the homopolymer or random copolymer matrix. However on a practical level, as used in the production of impact copolymer polypropylene products, b/a defines the ratio of the melt flow of the homopolymer/random copolymer reactor product (typically Reactor No. 1) to that of the overall impact copolymer reactor product (typically Reactor No. 2), according to the following equation, with both melt flows measured on stabilized powder samples:

$$\beta/\alpha = [(MFR_1/MFR_2)^{0.213} - 1]/(Fc/100) + 1$$

where $MFR_1$ is the matrix phase only and $MFR_2$ is the overall ICP.

Refractive index (n) is measured in accordance with ASTM D 542. The term "|n1−n2|" is the absolute value of the difference between n1 and n2, and may also be denoted by the term "Δn." Values for Δn may be greater than 0.002, or from greater than 0.002 to 0.1. In this sense, Δn denotes a "refractive index mismatch" between the polymeric components of the composition.

In order to determine dispersed phase particle size and shape, Transmission Electron Microscopy (TEM) is used. The TEM method is as follows:

Samples are prepared by injection molding to form 20 mil (15.75 g/sec fill rate, melt 240° C. and mold 38° C.) (60×60 mm) plaques. The injection molded plaques are trimmed so that sections can be collected at the core in both parallel and perpendicular orientations. The trimmed samples are cryopolished prior to staining by removing sections from the blocks at −60° C. to prevent smearing of the elastomer phases. The cryo-polished blocks are stained with the vapor phase of a 2% aqueous ruthenium tetraoxide solution for 3 hrs at ambient temperature. The staining solution is prepared by weighing 0.2 gm of ruthenium (III) chloride hydrate ($RuCl_3 \times H_2O$) into a glass bottle with a screw lid and adding 10 ml of 5.25% aqueous sodium hypochlorite to the jar. The samples are placed in the glass jar using a glass slide having double sided tape. The slide is placed in the bottle in order to suspend the blocks about 1 inch above the staining solution. Sections of approximately 90 nanometers in thickness are collected at ambient temperature using a diamond knife on a Leica EM UC6 microtome and placed on 400 mesh virgin TEM grids for observation. Images are collected on a JEOL JEM-1230 operated at 100 kV accelerating voltage and collected on a Gatan-791 and 794 digital cameras. The images are post processed using Adobe Photoshop 7.0.

Size distribution analysis: Image analysis is performed using Leica Qwin Pro V2.4 software from TEM images. The magnification selected for image analysis depends on the number and size of features to be analyzed. In order to allow for binary image generation of elastomer distributions, manual tracing of the elastomer domains from the TEM prints is carried out using a black Sharpie marker. The traced TEM images are scanned using a Hewlett Packard Scan Jet 4c and are imported into Adobe Photoshop 7.0. The images are enhanced by adjusting brightness and contrast to more clearly show the features of interest. The digital images are imported into a Leica Qwin Pro V2.4 image analysis program and converted to binary images by setting a gray-level threshold to include the features of interest. Once the binary images are generated, other processing tools are used to edit images prior to image analysis. Some of these features include removing edge features, accepting or excluding features and manually cutting features that require separation.

ICPs of the Present Invention

The propylene impact copolymers or ICPs of this invention comprise at least two major components, the matrix and the dispersed phase. The matrix phase will typically comprise from 60 to 95 percent, preferably from 65 to 90 percent, more preferably from 70 to 85, and alternatively from 70 to 80 or even 75 to 80 percent by weight of the ICP.

The matrix phase of the ICPs of the present invention is derived from propylene and optionally from 0 to 6 mol percent of one or more alpha-olefins (including ethylene) other than propylene. The matrix phase may comprise from 0, 0.1, 0.5, 1, or 1.5 mol percent comonomer to 6, 5.5, 5, 4.5, 4, 3.5, 3, 2.5, 2, 1.5. to 1 mol percent. (For purposes of the present invention when a series of upper and lower limits are given for ranges as in the preceding sentence, it is meant that any combination of a value identified as a lower range and a value identified as an upper range is expressly disclosed as a discreet range.) The matrix phase of the present compositions may comprise one or more individual polypropylene polymers (whether in-reactor or post reactor blends). While the optional alpha-olefin comonomer(s) can be ethylene or any $C_4$-$C_{12}$ alpha-olefin, it is generally preferred that the comonomer be ethylene. In many applications it is preferred that propylene homopolymer be used. In general, stiffness is improved with less comonomer, while impact resistance and optical properties are improved with increasing comonomer content. In applications where stiffness is critical, it is preferred that the first polypropylene polymer comprise at least 99 mol percent of units derived from propylene.

The second major component of the ICPs of the present invention is the dispersed phase. The dispersed phase will typically comprise from 5 to 40 percent by weight of the ICP, that is, the Fc for the ICPs of the present invention will be from 5 to 40. In general, the dispersed phase will comprise at least 5, 10, 15, 20, or 25% by weight of the ICP, and in general, no more than 40, 35, 30, 25 or 20% by weight of the ICP. The dispersed phase of the present compositions may comprise one or more individual polymers (whether in-reactor or post reactor blends).

The dispersed phase comprises one or more alpha-olefin copolymers, and imparts good impact properties to the impact copolymer. In general, it is preferred that the dispersed phase comprise ethylene or propylene copolymers, meaning copolymers which in total comprise at least 50 percent by weight of units derived from ethylene or propylene. The other comonomer can be ethylene or propylene (depending on whether it is an ethylene copolymer or a propylene copolymer), any $C_4$-$C_{12}$ alpha-olefin, or combinations thereof. When the alpha-olefin copolymer is derived from ethylene and propylene, it is preferred that the units derived from ethylene comprise from 55, 60, 65 percent up to 80, 75 or 70 weight percent. For example, the ethylene may comprise from 55 to 80 weight percent of the dispersed phase (that is an $E_c$ of from 55 to 80 weight percent). The dispersed phase will comprise a copolymer derived from a first comonomer selected from the group consisting of propylene and ethylene, or combinations thereof, together with a second alpha-olefin comonomer. When the alpha-olefin copolymer is derived from the first comonomer and butene, it is preferred that the units derived from the first comonomer comprise from, 55, 60, 65 percent up to 80, 75 or 70 weight percent. For example, the first comonomer may comprise from 55 to 80 weight percent of the dispersed phase. When the alpha-olefin copolymer is derived from the first comonomer and hexene then the first comonomer comprise from 40 to 80 weight % of the dispersed phase more preferably from 40, 45, 50, 55, 60, 65 percent up to 80, 75, 70 or 65 weight percent. When the alpha-olefin copolymer is derived from octene and the first comonomer then the first comonomer comprises from 35 to 75 weight % of the dispersed phase, more preferably from 35, 40, 45, 55, 60, 65 percent up to 75, 70, 65, 60, 55 or 50 weight percent. It is generally preferred that the dispersed phase comprise propylene/ethylene copolymers.

The above ranges generally define a range where the resulting dispersed phase will not have a refractive index within 0.002 of the refractive index for the matrix phase.

The ICPs of the present invention are further characterized by having a beta/alpha ratio less than or equal to 1.1, preferably less than or equal to 1.05, more preferably less than or equal to 1.0.

While these ICPs can be produced by melt compounding the individual polymer components, it is preferred that they are made in-reactor. This is accomplished by polymerizing the monomer(s) (propylene, for example) to be used as the matrix phase in a first reactor and transferring the resulting polymer from the first reactor into a second reactor where the monomers comprising the dispersed phase are polymerized in the presence of the matrix phase. It should be understood that "first" and "second" reactor are used to designate whether the reactor produces the matrix phase (generally referred to as reactor 1) or the dispersed phase (generally referred to as reactor 2) but that each "reactor" may each comprise more than one physical reactor and be situated in any order. Such "reactor-grade" products, theoretically can be interpolymerized in one reactor, but are more preferably formed using two reactors in series. The impact copolymers of this invention may conveniently be prepared by conventional (for impact copolymers) polymerization processes, such as a two-step process, although it is conceivable that they may be produced in a single reactor. Each step may be independently carried out in a gas phase or other particle forming process. For example, the first step may be conducted in a gas phase or other particle forming process. The dispersed phase is preferably polymerized in a second, gas phase reactor.

In an alternative embodiment, the polymer material used for the matrix is made in at least two reactors in order to obtain fractions with varying melt flow rate and/or varying comonomer content. This has been found to improve the processability and some physical properties of the impact copolymers.

As is generally known in the art, hydrogen may be added to any of the reactors to control molecular weight, intrinsic viscosity and melt flow rate (MFR).
The composition of the dispersed rubber phase is controlled (typically in the second reactor) by the ratio of the alpha-olefin comonomers and the amount of hydrogen.

The final impact copolymers as obtained from the reactor or reactors, can be blended with various other components including other polymers. A variety of additives may be incorporated into the impact copolymer for various purposes as is generally known in the art. Such additives include, for example, stabilizers, antioxidants (for example hindered phenols such as Irganox™ 1010 from the BASF Corporation), phosphites (for example Irgafos™ 168 from the BASF Corporation), cling additives (for example polyisobutylene), polymeric processing aids (such as Dynamar™5911 from 3M Corporation or Silquest™ PA-1 from Momentive Performance Materials), fillers, colorants, clarifiers (for example, Millad 3988i and Millad NX8000 from Milliken & Co.); antiblock agents, acid scavengers, waxes, antimicrobials, uv stabilizers, nucleating agents (for example NA-11 from Amfine Corporation), optical brighteners and antistat agents.

The ICPs of the present invention may be cracked using peroxides or other agents in order to increase the MFR, as is generally known in the art. In a preferred embodiment the in-reactor ICPs of the present invention have a melt flow rate of at least 4 g/10 min, preferably at least 8 g/10 min, more preferably 12 g/10 min, still more preferably at least 20 g/10 min, or even 25 g/10 min prior to subjecting the ICPs to any cracking process. The cracked ICPs may have an MFR greater than 25, 30, 40, 50, 60, 70, 80, 90, or 100 g/10 min.

The ICPs of the present invention are well suited for use in thin walled molding applications. During such processes, flow forces and/or shear forces stretch or otherwise strain the molten elastomer particles as the polymeric blend moves through the mold die. The forces during molding strain the elastomer particles to an entropically disfavored state. In this strained state, the elastomer particles may exhibit an elongated and/or rod-shaped morphology. The process further includes crystallizing the matrix phase before the elongated particles of elastomer return to an un-stretched, non-elongated, or otherwise thermodynamically favorable state. In other words, the matrix phase is crystallized before the elongated elastomer particles cool, thereby immobilizing or otherwise freezing the elongated elastomeric particles in their entropically disfavored state. In an embodiment, the process includes cooling the molded article and preventing strain recovery of the elongated elastomer particles.

An "elongated elastomer particle," as used herein, is an elastomer present in a molded article as a discontinuous phase dispersed within a continuous phase, the elongated elastomer particle having an average length of the longer (or "major") axis at least 5 times, alternatively 10 times, the average length of the shorter (or "minor") axis from a sectional view taken along an axis extending through the mold flowpath. The "flowpath" or "mold flowpath" is the direction of travel of the plastic polymeric blend through the mold. The length and width of the elongated elastomer particle is determined by way of transmission electron microscopy (TEM). The elongated elastomer particles are parallel to, or substantially parallel to, the flowpath. The elongated elastomer particles advantageously do not interfere with the transmission of the light traveling (i.e., do not scatter light) through the article thereby improving clarity and reducing haze of the molded article. Therefore it is preferred that the elastomer particles have an average length of the minor axis of less than 150 nanometers.

The ICPs of the present invention are characterized by their toughness as measured by impact resistance. Preferred ICPs have an impact resistance, as measured by ASTM D-5420 (commonly referred to as Gardner) at −40° C., of greater than or equal to 100 inch-pounds, preferably greater than or equal to 150 inch-pounds, 175 or even 200 inch-pounds.

The ICPs of the present invention are also characterized by their stiffness as evidenced by modulus, as determined by ASTM D 790A. Preferably the ICPs of the present invention have a modulus of at least 120, 135, or preferably 150 kpsi.

The ICPs of the present invention are also characterized by their optical properties, and in particular haze. Haze is determined by ASTM D 1003, 20 mil (508 micron) plaque Preferably the ICPs of the present invention have a haze below 30%, preferably less than 25%, 20%, 15%, 10%, 9%, 8% or even 7%.

The properties of the inventive compounds make them particularly well suited for thin walled articles, thin walled injection molded articles, particularly thin walled injection molded articles for frozen food packaging applications.

EXAMPLES

Test Methods

Gardner impact resistance was determined in accordance with ASTM D5420GC. Impact testing was performed according to ASTM D5420-10, The Standard Test Method for Impact Resistance of Flat, Rigid Plastic Specimen by Means of a Striker Impacted by a Falling Weight (Gardner Impact). The testing was performed using a Gardner IM-5547 Automatic Lift Impact Tester (Paul Gardner Company, Pompano Beach, Fla.). Configuration of the apparatus was 'standard ring-in'. The falling weight, or hammer, weighed 8 lbs for all testing. In order to determine the mean failure energy, the drop height of the hammer was varied according to the Bruceton Staircase or up and down method. Specimens were conditioned for 6 hours prior to testing. The conditioning freezers were set to −20 and −40° C. Disks were removed from their respective freezers immediately before testing, with approximately 20 seconds elapsing between the time of removal and the moment of impact.

Flexural Modulus (1% Secant) was determined in accordance with ASTM D790A Method I, using an ASTM D638 Type 1 specimen tested at 1.3 mm/min.

Haze was measured in accordance with ASTM D1003 on 20 mil injection molded (15.75 g/sec fill rate, melt 240° C. and mold 38° C.) (60×60 mm) plaques.

Procedure

Polymer Generation

Examples 1-3 were generated in a fluidized bed reactor system. Example 4 resin was derived by vis-breaking Example 3 resin via extrusion with Trigonox 101 peroxide. Comparative Examples 5 and 8 are Dow commercial ICP made via the Unipol™ process. Comparative Examples 6 and 7 are Dow commercial polypropylene random copolymers (RCP) made via the Spheripol™ process.

A typical fluidized bed reactor system to make the inventive impact copolymers can be described as follows:

The reactor system used to generate impact copolymer (ICP) is comprised of two fluidized bed reactors linked in series. Catalyst is fed to the first reactor to make polymer as the matrix material in an ICP. This resin from the first reactor is transferred to the second reactor for continued polymerization to intimately incorporate the rubber component of the ICP within the matrix. Reactor gas from the second reactor is typically used to transfer resin from the product discharge system of the first reactor to the fluidized bed of the second reactor via the inter reactor transfer system.

The linked reactors, however, each function independently as a fluidized bed reactor as discussed in greater detail below:

The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomers and, if desired, modifiers and/or an inert carrier gas.

The essential parts of the reaction system are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

The fluidized bed reactors are operated at a temperature in the range of about 40° C. to about 150° C. and preferably about 60° C. to about 120° C. and a pressure of about 50 psig to about 700 psig and preferably about 250 psig to about 550 psig. The velocity of the fluidizing gas is in the range of about 0.1 to about 3.0 feet per second and preferably about 0.5 to about 2.0 feet per second. The weight flow ratio of monomer(s) to catalyst in the first reactor is about 1000:1 to about 100,000:1 and is preferably about 10,000:1 to about 100,000:1.

Propylene or a mixture of propylene and at least one alpha-olefin having 2 to 8 carbon atoms is introduced together with hydrogen and catalyst into the first reactor. The alpha-olefin components can be, for example, ethylene, 1-butene, or 1-hexene, or various mixtures of alpha-olefin. The combination of components and conditions, previously mentioned, lead to a mixture of homopolymer or copolymer of propylene together with active catalyst embedded in the polymer matrix. Polymerization was done using triethyl aluminum (TEA1) as the co-catalyst.

To illustrate, the specific conditions of the fluid bed reactor system for Examples 1, 2 and 3 are given in Table 1 below:

TABLE 1

| | | | Example 1 | Example 2 | Example 3 |
|---|---|---|---|---|---|
| | Catalyst Type | | SHAC™ 320 | SHAC™ 320 | SHAC™ 320 |
| Rx1 | Melt Flow | (g/10 min) | 17.4 | 22.2 | 7.0 |
| | XS - Wet | (wt %) | 2.02 | 2.40 | 2.36 |
| | Rx1 Et | (wt %) | 0.0 | 0.0 | 0.0 |
| Rx2 | Melt Flow | (g/10 min) | 25.4 | 24.52 | 8.0 |
| | Fc | (wt %) | 28.5 | 28.7 | 28.3 |
| | Ec | (wt %) | 54.5 | 65.7 | 63.8 |
| Rx1 | Reactor Temperature | (° C.) | 72 | 72 | 72 |
| | Residence Time | (hr) | 1.6 | 1.78 | 1.88 |
| | $C_3$ Partial Pressure | (psi) | 305 | 276 | 276 |
| | $C_2$ Partial Pressure | (psi) | 0 | 0 | 0 |
| | $H_2/C_3$ Molar Ratio | — | 0.02 | 0.029 | 0.009 |
| | Alkyl Type | | TEAl | TEAl | TEAl |
| | SCA Type | — | SHAC™ Catalyst ADT 5500-N Donor | SHAC™ Catalyst ADT 5500-N Donor | SHAC™ Catalyst ADT 5500-N Donor |
| | Calc. Al/SCA Molar Ratio | — | 2.6 | 2.50 | 2.52 |
| | Calc. SCA/Ti Molar Ratio | — | 18.8 | 19.7 | 19.8 |
| Rx2 | Reactor Temperature | (° C.) | 70 | 70 | 70 |
| | Residence Time | (hr) | 1.8 | 1.764 | 1.88 |
| | $C_2$ Partial Pressure | (psi) | 51.8 | 49.95 | 30.06 |
| | $C_3$ Partial Pressure | (psi) | 114.4 | 64.69 | 39.35 |
| | $H_2/C_3$ Molar Ratio | — | 0.522 | 0.535 | 0.8516 |
| | Alkyl Type | | | | |
| | SCA Type | — | NPTMS | NPTMS | NPTMS |
| | $SCA_2/SCA_1$ Molar Ratio | — | 0.12 | 0.166 | 0.172 |

™indicates a trademark of The Dow Chemical Company

Polymer Analyses

The Examples were analyzed as follows:

Rubber content (Fc), ethylene content of the rubber (Ec) and ethylene content of matrix (Em) were determined by FTIR.

Melt flow rate of the matrix (MFR1) and ICP (MFR2) were measured in accordance with ASTM D 1238-01 test method at 230° C. with a 2.16 kg weight for propylene-based polymers.

Xylene Solubles of the matrix (XSR1) was measured according to the following procedure. 0.4 g of polymer is dissolved in 20 ml of xylenes with stiffing at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration was maintained with Viscotek PolyCAL™ polystyrene standards.

$\beta/\alpha$ was calculated via Fc, MFR1 and MFR2 according to the aforementioned formula.

The physical/optical properties of all Example and Comparative resins were determined as indicated above. A TEM image taken from the ICP of Example 2 is presented in FIG. 1.

The results of the resin analyses and resin physical/optical property measurements are given in Table 2 below:

TABLE 2

| Examples | MFR1 g/10 min | XSR1 wt % | Fc wt % | Ec wt % | MFR2 g/10 min | β/α | Em wt % | Flex Mod kpsi | Gardner −20° C. in * lbs | Gardner −30° C. in * lbs | Gardner −40° C. in * lbs | Haze 20 mil % |
|---|---|---|---|---|---|---|---|---|---|---|---|---|
| Ex 1 [1] | 17 | 2.0 | 29 | 55 | 25 | 0.73 | 0 | 159 | 324 | | 280 | 21 |
| Ex 2 [1] | 22 | 2.4 | 29 | 66 | 25 | 0.93 | 0 | 183 | 318 | | 208 | 17 |
| Ex 3 [1] | 7 | 2.4 | 28 | 64 | 8 | 0.90 | 0 | 157 | 324 | | 321 | 15 |
| Ex 4 (visbroken Ex 3) [1] | | | | | 25 | | | 157 | 324 | | 321 | 15 |

| Comparative Examples | MFR1 g/10 min | XSR1 wt % | Fc wt % | Ec wt % | MFR2 g/10 min | β/α | Em wt % | Flex Mod ksi | Gardner −20° C. in * lbs | Gardner −30° C. in * lbs | Gardner −40° C. in * lbs | Haze 20 mil % |
|---|---|---|---|---|---|---|---|---|---|---|---|---|
| Comparative Ex 5 [2] | | | 30 | | 75 | >1.1 | 0 | 144 | | | 324 | 98 |
| Comparative Ex 6 [3] | | | 0 | | 2 | | 3 | 162 | [4] | | | 6 |
| Comparative Ex 7 [3] | | | 0 | | 35 | | 4 | 158 | [4] | | | 5 |
| Comparative Ex 8 [2] | | | 19 | | 35 | >1.1 | 0 | 191 | 162 | | | 96 |

[1] Additives (ppm): Irganox-1010 (400); Irgafos-168 (800); calcium stearate (700); Millad-3988i (2000)
[2] nucleated with sodium benzoate
[3] clarified with Millad-3988i
[4] broke 4 lbs. @ 2 in.

Although the invention has been described in considerable detail through the preceding description and examples, this detail is for the purpose of illustration and is not to be construed as a limitation on the scope of the invention as it is described in the appended claims. It should be understood that it is expressly contemplated that the following claims may be combined in any order, unless such combination would result in a claimed structure containing incompatible recitations. All United States patents, published patent applications and allowed patent applications identified above are incorporated herein by reference.

What is claimed is:

1. A process to make a composition in sequential polymerization whereby a matrix phase is polymerized in one step(s) and then a dispersed phase is polymerized in another step(s), and wherein either the matrix phase or the dispersed phase is polymerized in the presence of the other component; the composition consisting essentially of:
   (a) a matrix phase which comprises from 60 to 95 weight % of the composition, the matrix phase comprising a polypropylene polymer containing from 0 to 6 mole % of units derived from one or more alpha-olefins other than propylene, and
   (b) a dispersed phase which comprises from 5 to 40 weight % of the composition, the dispersed phase comprising a copolymer derived from a first comonomer consisting of ethylene, and a second comonomer consisting of a $C_4$-$C_{12}$ alpha-olefin;
wherein the composition has a beta/alpha ratio less than or equal to 1.0 and is cracked to an MFR greater than 35 g/10 min, and wherein a fabricated article made from such composition has a haze value less than about 30% on a 20 mil plaque as measured in accordance with ASTM D 1003.

2. The process of claim 1 wherein the dispersed phase is polymerized in the presence of the matrix phase.

3. The process of claim 1 wherein the dispersed phase is made at a gas phase or other particle forming, reactor.

4. The process of claim 1 wherein the overall melt flow rate of the composition is at least 12 g/10 min prior to cracking.

5. The process of claim 1 wherein the composition has a melt flow rate of at least 20 g/10 min prior to cracking.

6. The process of claim 1 wherein the composition is an in-reactor composition.

7. A product made from the process of claim 1 characterized in that the product has a 1% secant modulus of greater than or equal to 120 kpsi as measured by ASTM D790A.

8. A product made from the process of claim 1 wherein the product is selected from the group consisting of thin wailed articles; thin walled injection molded articles; and thin walled injection molded, articles for frozen food packaging applications.

9. The process of claim 1, wherein the second comonomer is butene and the first comonomer comprises from 55 to 75 weight % of the dispersed phase.

10. The process of claim 1, wherein the second comonomer is hexene and the first comonomer comprises from 40 to 75 weight % of the dispersed phase.

11. The process of claim 1, wherein the second comonomer is octene and the first comonomer comprises from 35 to 75 weight % of the dispersed phase.

* * * * *